(12) United States Patent
Grieco et al.

(10) Patent No.: US 9,727,722 B2
(45) Date of Patent: Aug. 8, 2017

(54) NON-INTRUSIVE MONITORING

(71) Applicant: Cisco Technology, Inc., San Jose, CA (US)

(72) Inventors: Anthony H. Grieco, Wake Forest, NC (US); Chirag Shroff, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 14/628,854

(22) Filed: Feb. 23, 2015

(65) Prior Publication Data

US 2016/0245862 A1    Aug. 25, 2016

(51) Int. Cl.
*G06F 21/45* (2013.01)
*G01R 31/3185* (2006.01)

(52) U.S. Cl.
CPC ..... *G06F 21/45* (2013.01); *G01R 31/318588* (2013.01)

(58) Field of Classification Search
CPC ....................................................... G06F 21/45
USPC ......................................................... 726/23
See application file for complete search history.

(56) References Cited

U.S. PATENT DOCUMENTS

| | | | | |
|---|---|---|---|---|
| 5,001,713 A * | 3/1991 | Whetsel | ......... | G01R 31/318555 714/727 |
| 7,620,862 B1 * | 11/2009 | Lai | ................. | G01R 31/318519 713/500 |
| 7,796,036 B2 | 9/2010 | Dalzell et al. | | |
| 8,341,472 B2 | 12/2012 | Henry et al. | | |
| 8,719,957 B2 | 5/2014 | Pedersen | | |
| 2007/0168669 A1 | 7/2007 | Jonas | | |
| 2007/0174700 A1 | 7/2007 | Dalzell et al. | | |
| 2009/0070887 A1 * | 3/2009 | Knowles | ............... | H01L 23/576 726/34 |
| 2009/0198991 A1 * | 8/2009 | Owens | ................... | G06F 21/575 713/2 |

OTHER PUBLICATIONS

Intellitech, "JTAG Security," 2009, retrieved from http://www.intellitech.com/pdf/anti-tamper-basics.pdf, on Feb. 23, 2015, 17 pages.
Freescale Semiconductor, "i.MX53 Applications Processors for Industrial Products, Silicon Version 2.1," Data Sheet: Technical Data, Document Number: IMX53IEC, Rev. 6, Mar. 2013, 173 pages.
Rosenfeld, et al., "Attacks and Defenses for JTAG," Verifying Physical Trustworthiness of ICs and Systems, IEEE Design & Test of Computers, Aug. 2009, 12 pages.

* cited by examiner

*Primary Examiner* — Jacob Lipman
(74) *Attorney, Agent, or Firm* — Edell, Shapiro & Finnan, LLC (57) ABSTRACT

A technique for detecting unauthorized manipulation of a circuit. In one embodiment, a test data channel of a boundary scan system of a circuit is monitored while the circuit is in operation. By monitoring the test data channel, a monitoring module determines the presence of a signal on the test data channel. During operation, activity on this channel may represent a potential unauthorized manipulation attempt. An alarm condition may therefore be created if a signal is detected.

20 Claims, 6 Drawing Sheets

NON-INTRUSIVE MONITORING

The present disclosure relates to protection of circuits against unauthorized manipulation.

BACKGROUND

In the current information-based world, any given electronic product may be widely proliferated. Production and sales of a large numbers of units is common, given the ubiquity of information processing and communications needs. A particular circuit board, for example, may be fielded in quantities in the tens of thousands or more.

Given this degree of proliferation, it has become common for such electronic products or devices to be modified in an unauthorized manner. Such modifications, or "hacks", may be performed for purposes of enhancing or otherwise changing the performance of these devices. The goal of such hacks may be to tailor a device to other needs, or make them compatible with other components or systems, for example. Other hacks may represent attempts to extract data. Such modifications are typically beyond the control of the original manufacturer.

Further, such modified products may then be bought and sold through nontraditional marketing channels. A hacked circuit board may be bought or sold on black or gray markets. The result is that a user may come into possession of a product, originally built by a known manufacturer, but the user may have little confidence in the product's ostensible performance parameters. The capabilities of the product and its compatibility with other devices or systems may be in doubt.

DESCRIPTION OF EXAMPLE EMBODIMENTS

Overview

A technique is described herein for detecting unauthorized manipulation of a circuit. A test data channel of a circuit is monitored while the circuit is in operation. By monitoring the test data channel, a monitoring module determines the presence of a signal on the test data channel. During operation, activity on this channel may represent a potential attempt at unauthorized manipulation of the circuit. An alarm condition may therefore be created if a signal is detected.

The logic in the monitoring module may be implemented as trusted logic. In an embodiment, the circuit may be a circuit board and the monitoring module may be implemented as a field programmable gate array (FPGA) on the circuit board. Trust in the logic as programmed into the FPGA may be ensured through a cryptographically-based signature process. A key may be used to sign the logic, so that the logic may be trusted at start-up. In an embodiment, the key may be the same as that used in a secure boot process for a central processing unit (CPU) on the circuit board, or may have its trust derived from the same digital certificate used to establish trust in the boot process of the CPU.

EXAMPLE EMBODIMENTS

The systems and methods discussed herein detect unauthorized manipulation of a circuit. Detection of such manipulation is performed by monitoring a test data channel. The test data channel electrically connects some or all of the components in a circuit board and, while the test data channel is normally used for legitimate purposes, it may also be used by those attempting to manipulate or hack the circuit. This connection of the components is sometimes called a boundary scan chain. An example of a test data channel is that described in the IEEE 1149.1 Standard Test Access Port and Boundary-Scan Architecture that originated in 1990 with the work of the Joint Test Action Group (JTAG). This architecture is sometimes known as the JTAG architecture, named after the working group. A JTAG interface is a standards-based hardware interface that normally supports the use of the test data channel for legitimate development and manufacturing activities. A JTAG interface allows low level test port access to various components on circuit boards. The JTAG interfaces are widely used to support low level debugging, firmware programming, boundary scans, etc. As a result of this wide use, there is an entire ecosystem that exists to create software and hardware interfaces to the JTAG interfaces.

Figure 1:
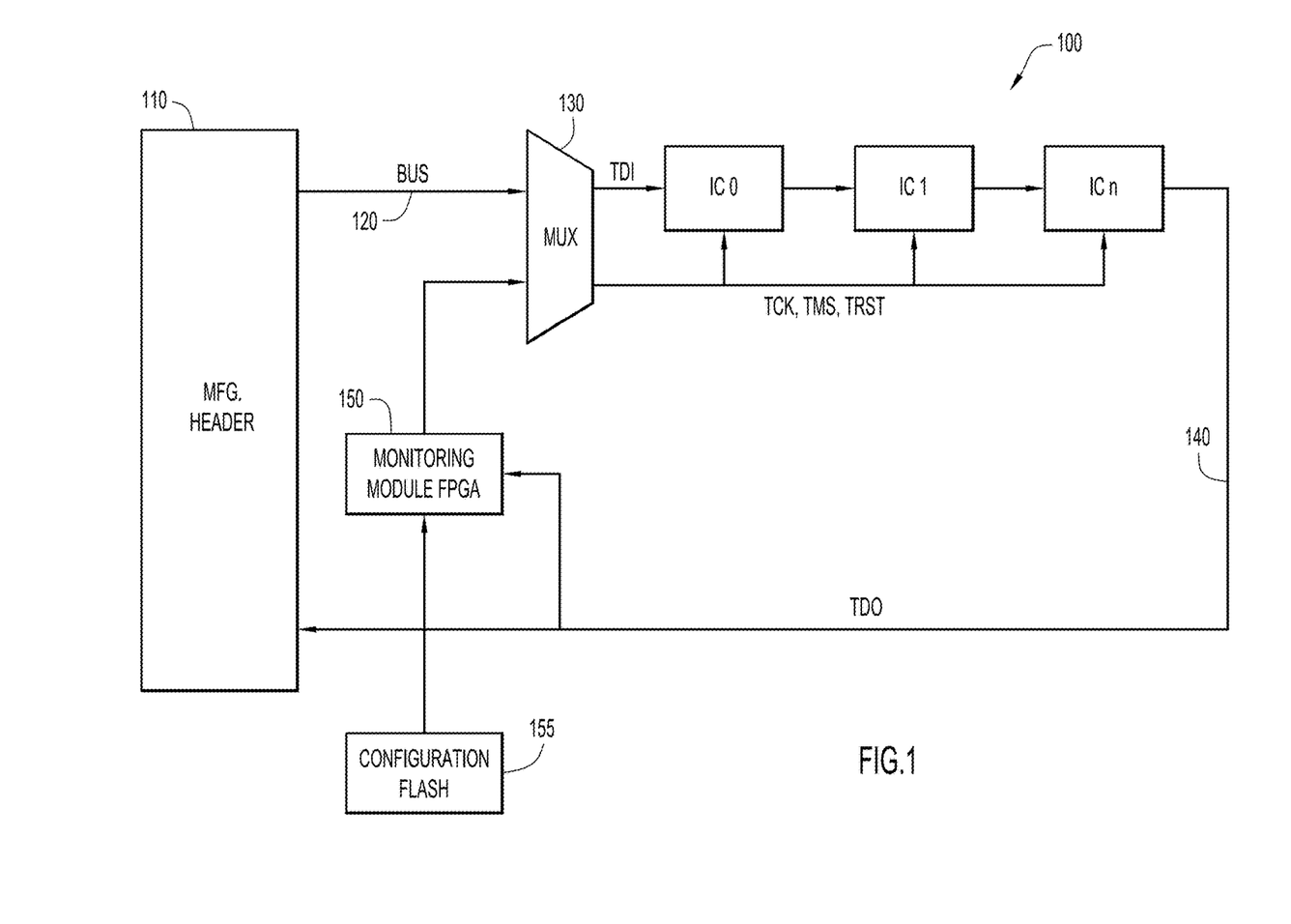
FIG. 1 is a block diagram illustrating a circuit using a boundary scan system as described herein, according to an embodiment.

On many circuit boards today, there can be multiple devices that have JTAG interfaces (e.g., FPGAs and a CPU on the same board). These interfaces are chained together from a wiring perspective and presented on the board through a single header for connectivity to a tooling ecosystem, for example. A boundary scan chain provides low-level access to devices. Once attached to this header, a user is able to perform a wide range of actions, even while the circuit board is running. Specifically, the user can read memory out of a running system (regardless of software or CPU-based access controls) for purposes of debugging, for example, or can reprogram flash (even if the software on the system has access controls that prevent others from doing so), for example. It is also possible to test for certain faults. Such faults may include, but are not limited to including, shorts, opens, and logic errors for example. This testing may be performed after manufacturing, or, in some cases, while the board is in operation. As illustrated in FIG. 1, which will be described below, signals provided to the ICs during testing may include a test_data_in (TDI) signal. An output signal is shown as test_data_out (TDO). Other signals provided to the ICs may include test_clock (TCK), test_mode_select (TMS) and test_reset (TRST).

As such, JTAG, while powerful, creates significant security vulnerabilities. A JTAG header, and components attached to the test data channel, can be easily accessed. The range of exploits possible with JTAG is broad. Hacking of a game console, router flashing, firmware extraction, and cryptographic key extraction from a running circuit board are all possible via JTAG.

The system described herein uses a trust anchor within the system to provided trusted functionality in a monitoring module and a strobe source, both of which are connected to the test data channel. The monitoring module is connected to the test data channel, passively watching for activity on the channel itself. As the product leaves the factory, the monitoring module can be enabled. The monitoring module watches for commands or other activity on the test data channel and takes action if the activity violates a pre-defined policy. Regular, expected activity could include all of the processing operations that are normally trusted, up to and including rebooting the device and reflashing of components, for example.

In an embodiment, a strobe may be used to ensure that the monitoring module has not been disconnected from the test data channel. Trust in the strobe function originates from the trust anchor and would send non-invasive commands to all components on the test data channel chain. This strobe would be observed by the monitoring module. If the monitoring module does not observe the expected strobe activity, action would be taken by trusted logic. The strobe may vary its activity in an ostensibly unpredictable way, making it difficult to spoof.

An embodiment of such a system is illustrated generally in FIG. 1. The illustrated system can be used to address vulnerabilities such as those described above. A circuit board 100 may have a number of devices mounted thereon. These devices may include integrated circuits (ICs), shown here as IC 0, . . . IC n. The ICs on the circuit board are connected (i.e., electrically chained) together. A physical header 110 is also connected to the chain. The header 110 is an interface that allows programming and/or testing of the components on the circuit board and of the board as a whole. Using the header 110, test equipment may be connected to the circuit board. The electrical path 140 that connects the ICs and the header 110 is referred to herein as the test data channel. In the illustrated embodiment, the header 110 is connected to the ICs through a bus 120 and a multiplexer 130. A monitoring module 150 is also shown connected to the test data channel 140. In the illustrated embodiment, the monitoring module 150 is implemented as a FPGA. The logic 155 programmed into the monitoring module 150 may be trusted, with its trust derived from a trust anchor; its operation will be discussed below.

The systems and methods described herein provide for monitoring of the test data channel, wherein unauthorized signals on this channel may be detected. This process is illustrated generally in FIG. 2. At 210, the test data channel is monitored for activity. At 220, a determination is made as to whether any activity is present on the test data channel. If none is found, monitoring continues. If activity is detected, the process continues at 230. Here the activity (i.e., any detected signal) is evaluated. This evaluation may be viewed as an application of a security policy. In some situations, a signal may be present, but it may be an authorized signal consistent with normal operation and acceptable under the policy. In other situations, the signal may represent unauthorized activity, at odds with the policy. At 240, a response takes place, consistent with the evaluation of 230. In an embodiment, the response may be the assertion of an alarm condition if the evaluated activity proves to have been unauthorized, for example. If the activity is determined to have been benign, the response may be a resumption of monitoring.

Figure 3:
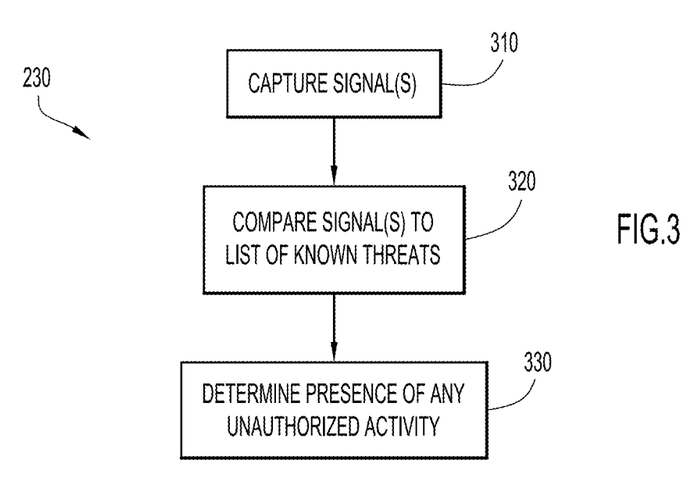
FIG. 3 is a flowchart illustrating evaluation of a signal on a test data channel, according to an embodiment.

The evaluation process 230 is illustrated in greater detail in FIG. 3. At 310, the monitoring module captures one or more signals on the test data channel. At 320, the captured signal is compared to a list of signals that are known to be threats, i.e., attempts at unauthorized access to the circuit board. In an embodiment, the comparison may use the signals themselves, but in other embodiments, signal parameters or other characterizations of the captured signal may be compared to characterizations of known unauthorized signals. Moreover, the list of signals representing possible threats reflects a security policy, and may vary over time and/or over different contexts. Updates to this list may therefore be desirable at times. At 330, using the comparison results, it is determined whether unauthorized activity is present.

Figure 4:
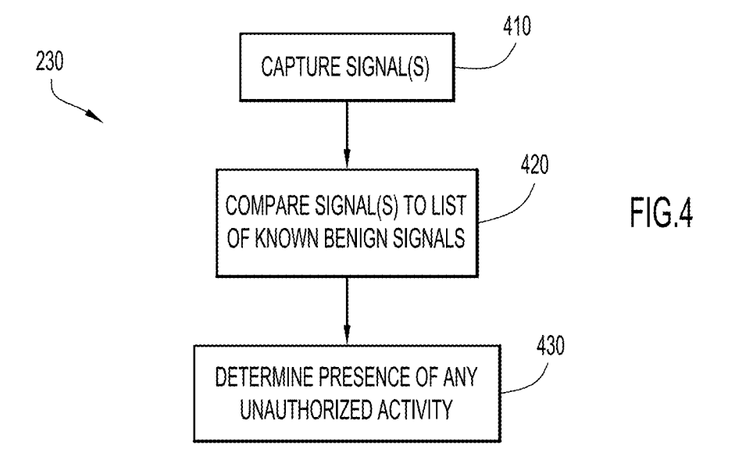
FIG. 4 is a flowchart illustrating evaluation of a signal on a test data channel, according to an alternative embodiment.

An alternative embodiment of evaluation process 230 is shown in FIG. 4. Here, a signal found on the test data channel is compared to a list of known benign (i.e., authorized) signals that are permitted on the channel. At 410, the signal(s) are captured at the test data channel. At 420, the captured signal(s) are compared to a list of signals that are permitted on the test data channel. The list of authorized signals may reflect a security policy. It should also be noted that the list of permitted signals may change over time, depending on context or mode. Again, updates to this list may therefore be necessary at times. If the circuit board is operational, certain signals may be permitted; if the board is in a test mode, the set of acceptable signals may be different. At 430, the comparison results are used to determine whether the captured signal(s) represent unauthorized activity.

Figure 2:
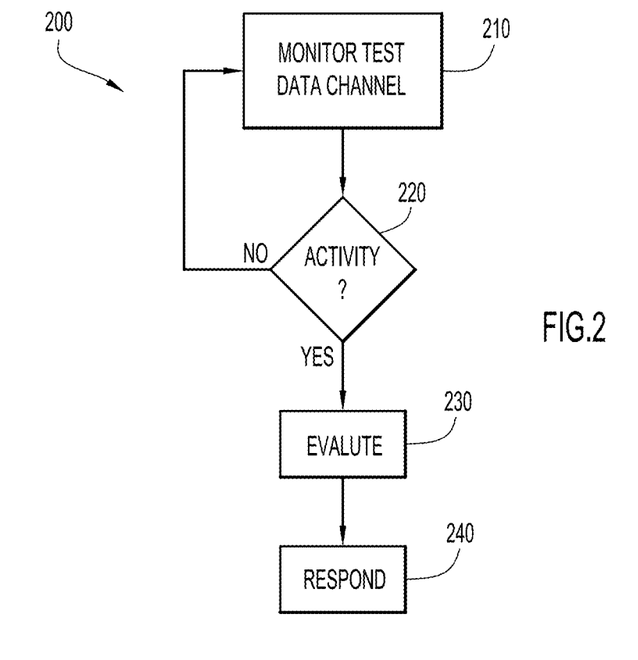
FIG. 2 is a flowchart illustrating the processing described herein, according to an embodiment.

The discussion above with respect to FIGS. 2-4 assumes that some signals may be present, where these signals are permitted to be on the test data channel. In some situations, the test data channel will normally be idle. This may be the case in operational settings, for example. In such a case, any activity on the test data channel can be presumed to be unauthorized, so that an evaluation step would be unnecessary. Here, any activity on the test data channel would dictate a response.

Figure 5:
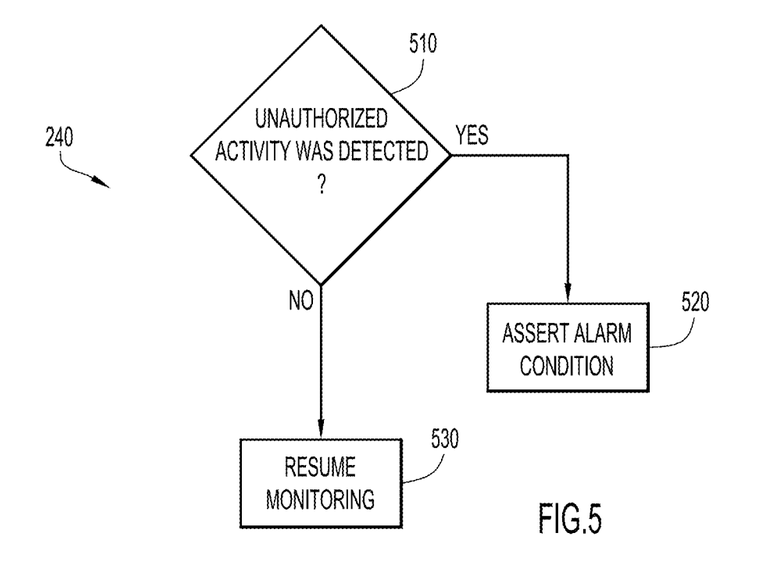
FIG. 5 is a flowchart illustrating a response to a signal on the test channel, according to an embodiment.

The response process (240 of FIG. 2) is illustrated in FIG. 5, according to an embodiment. At 510, it is determined if unauthorized activity was detected. If so, then at 520 an alarm condition may be asserted. Such a condition may take different forms in different embodiments. A flag corresponding to an alarm may be set; an indication may be provided to a user or administrator; the circuit board may be reset or powered down; and/or the alarm condition may be entered into a log. If no unauthorized activity was detected, then at 530 monitoring may be resumed.

In an embodiment, the logic of the monitoring module may be trusted logic. Trust in the logic as programmed into the FPGA may be ensured through a secure signature process, for example. A key may be used to sign the logic, so that at start-up the logic may be trusted. In an embodiment, the logic in the monitoring module may derive its trust from a trust anchor. This trust anchor may also represent a source of trust from which other logic in the circuit board derives trust. For example, the key may be the same as that used in a secure boot process for a central processing unit (CPU) on the circuit board, or the key may have its trust derived from the same digital certificate used to establish trust in the boot process of the CPU.

Generally, the trust in the monitoring module's logic may be derived through a process internal to the logic, such as a signature process or other internal integrity check. Alternatively or in addition, the monitoring module may include hardware measures and other physical precautions to protect the integrity of the module and its logic.

Figure 6:
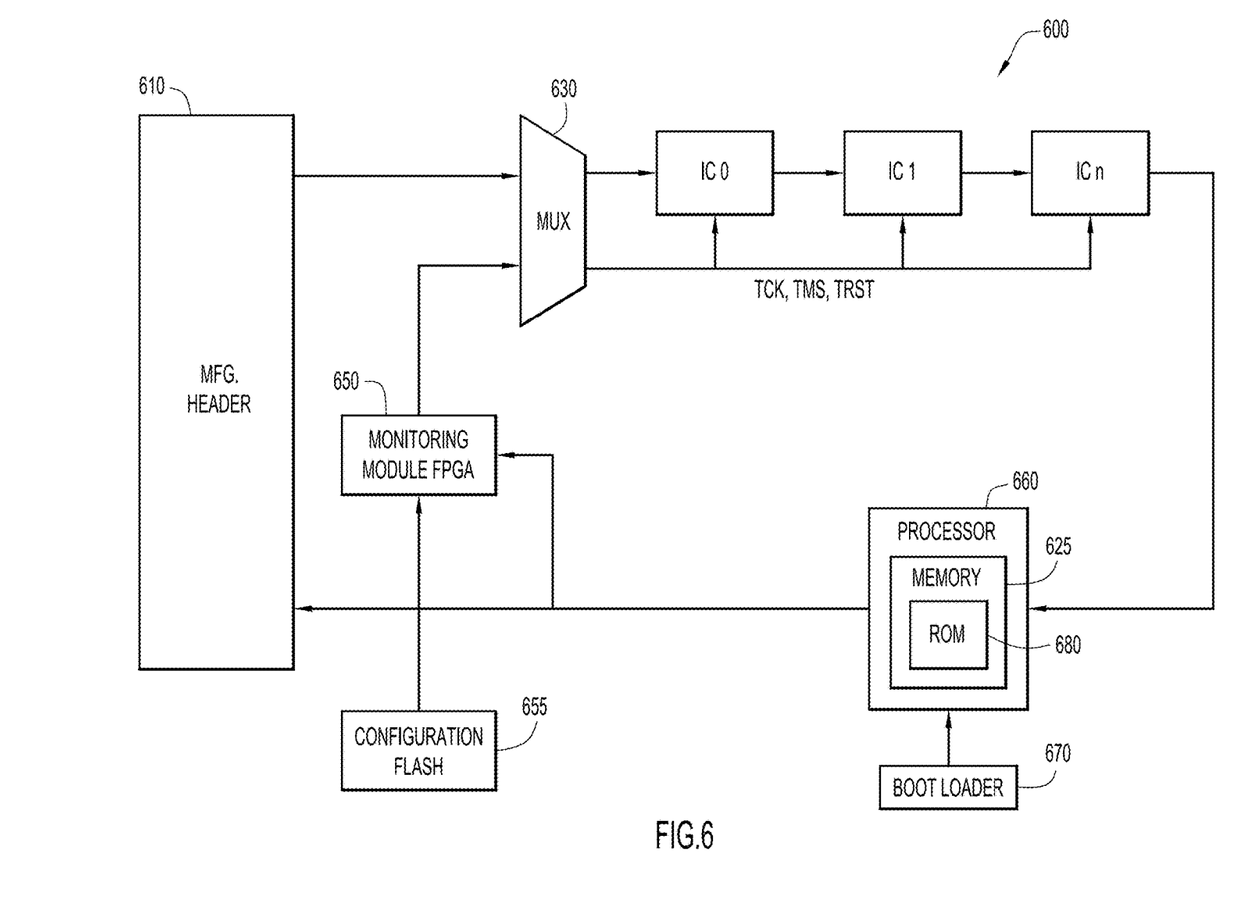
FIG. 6 is a block diagram of an embodiment with a securely booted processor.

An embodiment that includes a secure boot process is illustrated in FIG. 6. This figure shows an example block diagram of a circuit 600 configured according to the techniques described herein. This represents a variation of circuit 100 of FIG. 1, with the inclusion of components that allow secure booting. The security provided by the processing of the monitoring module 650 may be facilitated by securely booting the processor 660, which is described below according to an embodiment.

During a boot loader image validation for processor 660, the boot loader image may have an associated digital signature that may be verified prior to any decryption that may be necessary. When an image (encrypted or not) is digitally signed, the signed image is authenticated by the receiving device or component to verify the authenticity of the sender. For example, in this context, processor 660 may authenticate the digital signature of its corresponding boot. When the signed image is authentic, the image is obtained and used. Digital signatures may employ various forms of encryption, e.g., public key or the Advanced Encryption Standard (AES), and used for, among other things, verifying the authenticity of the sender to a receiver as described above.

Device 600 comprises a processor 660. Processor 660 has an integrated pre-boot Read-Only Memory (ROM) 680 (part of memory 625) and an associated boot loader 670. Circuit 600 may include one or more network interfaces (not shown) to provide network connectivity. The integrated pre-boot ROM 680 includes pre-boot functionality to partially start processor 660 in order to provide a mechanism to ensure that a trusted boot process is loaded from boot loader 670. For example, pre-boot ROM 680 provides firmware code or state machine logic that is trusted and that may provide security functions that include authentication/verification, decryption, and/or integrity check functions for boot loader 670, e.g., decryption keys, hash algorithms, etc. The trusted contents of ROM 680 may be viewed as a security anchor. A boot loader image from boot loader 670 brings processor 660 up to a complete trusted operating configuration. As boot loader firmware from boot loader 670 loads and executes, the desired security functions provided by pre-boot ROM 680 ensure trusted operation of processor 660. The combination of processor 660 and pre-boot ROM 680 provide a first stage in a trusted computing chain. Once processor 660 is fully operational, e.g., as verified by the pre-boot functions provided via pre-boot ROM 680, the operations performed by processor 660 are trusted according to a configured degree of security.

Returning to FIG. 1, if the monitoring module 150 were to fail or be disconnected from the test data channel, then the functionality discussed above with respect to FIG. 1 would be compromised. In an embodiment, a mechanism is implemented whereby the connectivity of the monitoring module 150 is checked. Here, trusted logic issues a message to the monitoring module, via the test data channel. The message may be sent repeatedly, regularly or irregularly, and may be viewed as a strobe. The logic of the strobe source may be implemented on the same FPGA as the monitoring module 150, wherein the strobe is sent via the test data channel back to the monitoring module 150. The logic of the strobe source may alternatively be implemented in software executing on a CPU of the circuit board, e.g., processor 660. Alternatively, the strobe source logic may be implemented elsewhere on the circuit board. In an embodiment, the strobe is expected by the monitoring module at predetermined times. If the monitoring module fails to receive the strobe at an expected time, this suggests that the monitoring module may be disconnected from the test data channel. This represents a vulnerable condition, in that the monitoring module is unable to serve its purpose, i.e., monitoring of the test data channel. Failure of the monitoring module to receive an expected strobe therefore results in an alarm condition.

Figure 7:
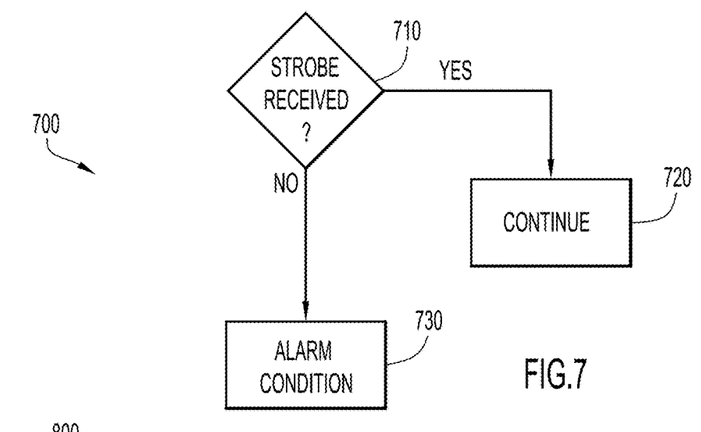
FIG. 7 is a flowchart illustrating processing of a strobe signal at a monitoring module, according to an embodiment.

The process of responding to a strobe is illustrated in FIG. 7, according to an embodiment. At 710, a determination is made at the monitoring module as to whether a strobe has been received. If so, then at 720 the processing at the monitoring module may continue as normal. If not, then at 730 an alarm condition is asserted. As before, the alarm condition may take various forms in different embodiments. A flag corresponding to an alarm may be set; an indication may be provided to a user or administrator; the circuit board may be reset or powered down; and/or the alarm condition may be entered into a log.

For security reasons, strobes may be sent on a schedule known only to the strobe source and the monitoring module in an embodiment. In this case, failure to receive a scheduled strobe would result in an alarm condition, as before. Receipt of an unscheduled strobe may also result in an alarm condition, since the unscheduled strobe could represent unauthorized activity on the test data channel and/or a spoofing attempt.

In an alternative embodiment, a response is required from monitoring module in order to determine its continued connectivity. Here, if the strobe is sent but not acknowledged by the monitoring module, then the monitoring module may have failed or become disconnected from the test data channel. This would result in an alarm condition.

Figures 8, 9:
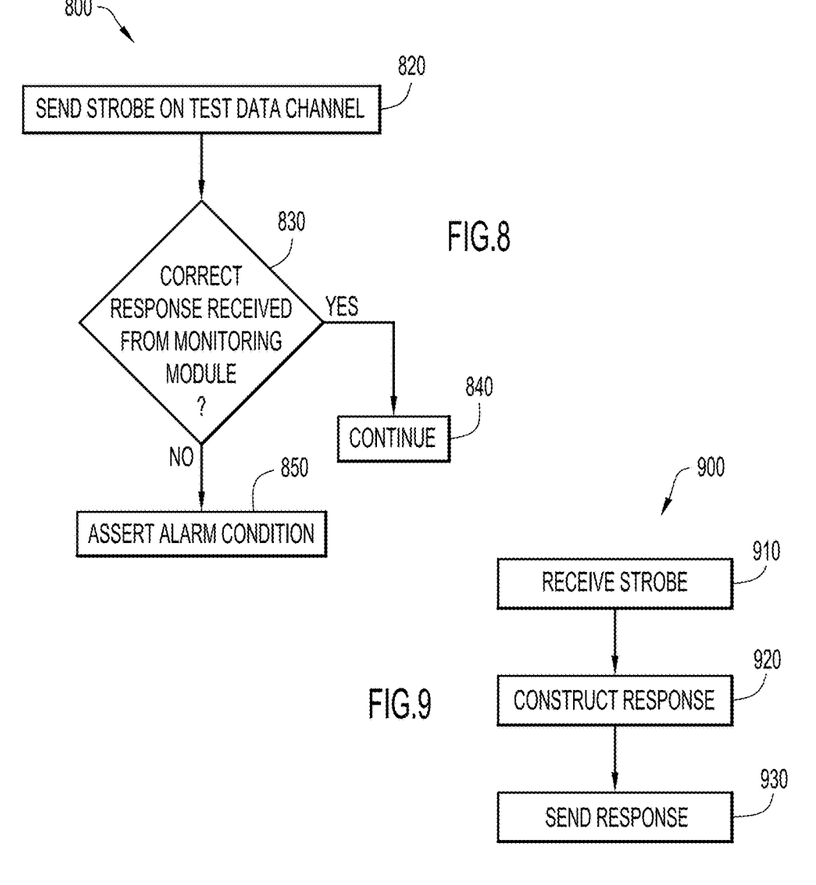
FIG. 8 is a flowchart illustrating processing of a strobe signal response at the strobe source.
FIG. 9 is a flowchart illustrating processing of a strobe signal at a monitoring module, according to an alternative embodiment.

This is illustrated in FIG. 8, from the perspective of a strobe source. At 820, the strobe is sent from the strobe source via the test data channel. At 830, a determination is made as to whether a correct response has been received. In an embodiment, the response may be received and processed at the strobe source. Alternatively, the response may be received and processed as another component. If a response is not received, then an alarm condition may be asserted at 850. As before, the alarm condition may take various forms in different embodiments. A flag corresponding to an alarm may be set; an indication may be provided to a user or administrator; the circuit board may be reset or powered down; and/or the alarm condition may be entered into a log.

In an embodiment where the response is expected from the monitoring module, precautions may be taken to make sure that the response is authentic, and not spoofed. Authentication mechanisms may therefore be used. This can take any of several forms in various embodiments. The response may incorporate a secret value known only to the monitoring module and the component receiving the response, e.g., the strobe source. To prevent playback attacks, this value may be updated for each strobe in a manner known only to the monitoring module and the trust anchor. In embodiments, the secret value may be generated and/or updated using a cryptographic or other pseudorandom deterministic process. Only if the response includes the correct value, as determined at the trust anchor, would the alarm condition be avoided.

Processing of the strobe at the monitoring module is illustrated in FIG. 9, according to such an embodiment. At 910, the strobe is received at the monitoring module. At 920, the monitoring module constructs a response message. As noted above, this may include generation of an authenticating secret value and incorporation of the value into the response. At 930, the response is sent to the trust anchor via the test data channel.

In an embodiment, the strobe source may be implemented in software executing on the CPU, or may be implemented in a separate module, or may be implemented in the same FPGA as the monitoring module. In either case, the logic in the strobe source may be implemented as trusted logic. As in the case of the monitoring module, trust in the strobe source can be derived from a security anchor.

Figure 10:
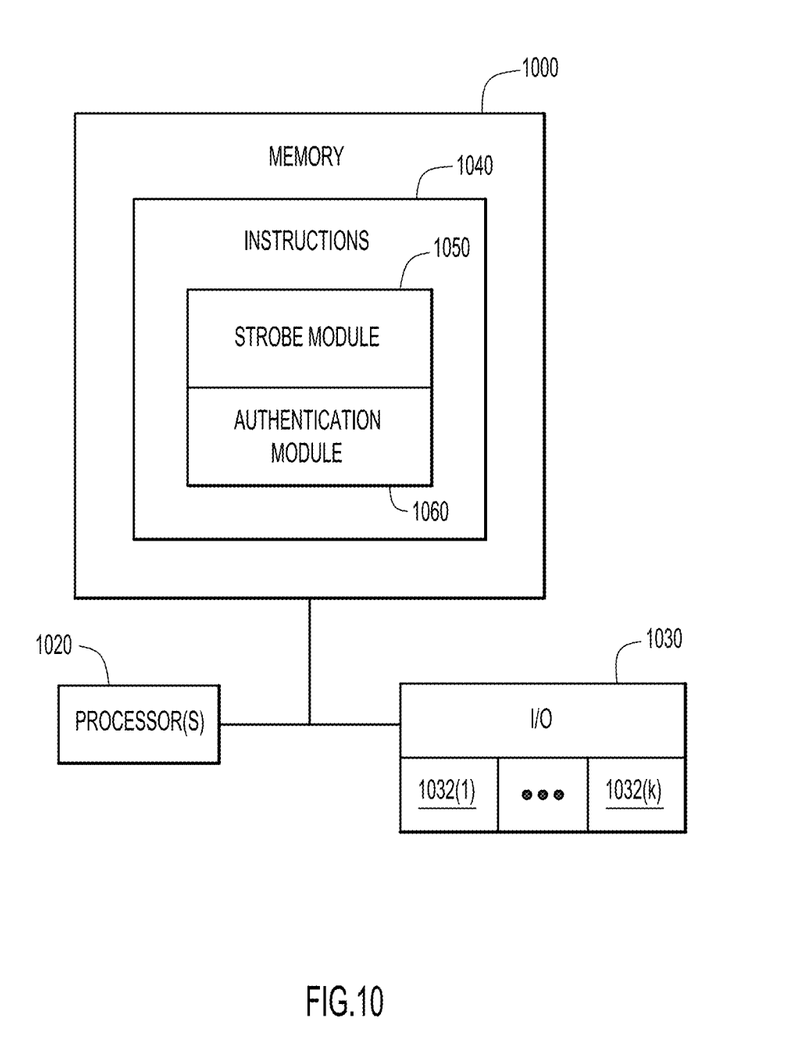
FIG. 10 is a block diagram illustrating a computing environment for the system described herein, according to an embodiment.

In an embodiment, the sending of a strobe and any authentication of a response are performed in accordance with software or firmware (or a combination thereof) executing on one or more processors. A software or firmware embodiment of these operations is illustrated in FIG. 10. Computing system 1000 includes one or more memory devices, shown collectively as memory 1010. Memory 1010 is in communication with one or more processors 1020 and with one or more input/output units 1030. An example of an I/O unit is a network processor unit that may have associated network ports 1032(1)-1032(K). In an embodiment, a strobe may be sent to the monitoring module via I/O 1030; a response to the strobe may also be received via I/O 1030. The I/O 1030 may include one or more Application Specific Integrated Circuits (ASICs) that are configured with digital logic gates to perform various networking and security functions (routing, forwarding, deep packet inspection, etc.).

Memory 1010 may comprise read only memory (ROM), random access memory (RAM), magnetic disk storage media devices, optical storage media devices, flash memory devices, electrical, optical, or other physically tangible (i.e., non-transitory) memory storage devices. Memory 1010 stores data as well as executable instructions 1040. Instructions 1040 are executable on processor(s) 1020. The processor(s) 1020 comprise, for example, a microprocessor or microcontroller that executes instructions 1040. Thus, in general, the memory 1010 may comprise one or more tangible (non-transitory) computer readable storage media (e.g., memory device(s)) encoded with software or firmware that comprises computer executable instructions. When the instructions are executed (by the processor(s) 1020) the software or firmware is operable to perform the operations described herein.

In the illustrated embodiment, the executable instructions 1040 may include several modules. These include a strobe source module 1050, responsible for sending of the strobe signal on the test data channel. An authentication module 1060 may also be present, where this module is responsible for authenticating the response received by the trust anchor from the monitoring module. As suggested above, in an embodiment the authentication of the response by the trust anchor provides assurance that the response was in fact sent by the monitoring module.

Software that performs the operations of a strobe source may, in an embodiment, be trusted. Trust in this logic may be ensured through a cryptographically-based signature process. A key may be used to sign the logic, so that the logic may be trusted once loaded. In an embodiment, the key may be the same as that used in a secure boot process for a CPU on the circuit board, or may have its trust derived from the same digital certificate used to establish trust in the boot process of the CPU.

Moreover, if the source of the strobe is a component (such as the CPU) distinct from the monitoring module, then any communications channel between the strobe source and the monitoring module may implemented as a trusted channel.

In summary, the techniques presented herein include monitoring a test data channel of a boundary scan system of a circuit while the circuit is in operation; determining presence of a signal on the test data channel; and creating an alarm condition if a signal is present, wherein the monitoring, determining, and creating are performed by a monitoring module according to trusted logic.

In one form, the above processing may be performed on an apparatus that includes one or more integrated circuits; a monitoring module; and a test data channel connecting the integrated circuits and the monitoring module in a boundary scan system, wherein the monitoring module comprises trusted logic that is configured to monitor the test data channel while the apparatus is in operation, determine the presence of a signal on the test data channel, and create an alarm condition if a signal is present.

In another form, a strobe signal is sent on test data channel that connects a monitoring module to one or more integrated circuits in a boundary scan system; and receives a response to the strobe signal from the monitoring module via the test data channel, indicating the monitoring module's connectivity to the test data channel.

In another form, processing is performed under the control of non-transitory computer readable storage media encoded with software comprising computer executable instructions that, when executed on a programmable processor, are operable to send a strobe signal on test data channel that connects a monitoring module to one or more integrated circuits in a boundary scan system; and receive a response to the strobe signal from the monitoring module via the test data channel, indicating the monitoring module's connectivity to the test data channel.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Functional building blocks are used herein to illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed. The breadth and scope of the claims should not be limited by any of the example embodiments disclosed herein.

What is claimed is:

1. A method comprising:
monitoring a test data channel of a boundary scan system of a circuit while the circuit is in operation;
determining presence of a signal on the test data channel; and
creating an alarm condition if the signal is present,
wherein the monitoring, determining, and creating are performed by a monitoring module according to trusted logic,
wherein trust for the trusted logic is derived from a trust anchor that is a component of a processor that is in communication with the test data channel and that is booted in a trusted state,
the method further comprising:
expecting a strobe signal at a predetermined time from a strobe source connected to the test data channel; and
sending a response to the strobe signal to the trust anchor, the response including a unique secret value that is generated in response to the strobe signal and that is generated for respective responses to subsequent strobe signals to confirm that the response and the respective responses are authentic.

2. The method of claim 1, further comprising:
if the strobe signal is not received at the predetermined time, asserting an alarm condition.

3. The method of claim 1, wherein the boundary scan system operates in accordance with the IEEE 1149.1 Standard Test Access Port and Boundary-Scan Architecture.

4. The method of claim 1, wherein the circuit comprises a circuit board, and the monitoring module is on the circuit board and connected to the test data channel.

5. The method of claim 4, wherein the monitoring module comprises a field programmable gate array.

6. The method of claim 1, further comprising:
evaluating the signal; and
creating the alarm condition if the evaluation shows that the signal is unauthorized.

7. The method of claim 6, wherein the evaluating comprises:
comparing the signal to a set of known benign signals, wherein the signal is determined to be unauthorized when the signal does not correspond to any of the known benign signals.

8. The method of claim 6, wherein the evaluating comprises:
comparing the signal to a set of known unauthorized signals,
wherein the signal is determined to be unauthorized when the signal corresponds to one or more of the known unauthorized signals.

9. An apparatus comprising:
one or more integrated circuits;
a monitoring module; and
a test data channel connecting the integrated circuits and the monitoring module in a boundary scan system;
wherein the monitoring module comprises trusted logic that is configured to:
monitor the test data channel while the apparatus is in operation;
determine presence of a signal on the test data channel; and
create an alarm condition if the signal is present,
wherein trust for the trusted logic is derived from a trust anchor that is a component of a processor that is in communication with the test data channel and that is booted in a trusted state, and
wherein the trusted logic is further configured to:
expect a strobe signal at a predetermined time from a strobe source connected to the test data channel; and
send a response to the strobe signal to the trust anchor, the response including a unique secret value that is generated in response to the strobe signal and that is generated for respective responses to subsequent strobe signals to confirm that the response and the respective responses are authentic.

10. The apparatus of claim 9, wherein the monitoring module is further configured to:
if the strobe signal is not received at the predetermined time, assert an alarm condition.

11. The apparatus of claim 9, wherein the wherein the boundary scan system is configured in accordance with the IEEE 1149.1 Standard Test Access Port and Boundary-Scan Architecture.

12. The apparatus of claim 9, wherein the apparatus comprises a circuit board on which the monitoring module and integrated circuits are mounted.

13. The apparatus of claim 12, wherein the monitoring module comprises a field programmable gate array.

14. The apparatus of claim 9, wherein the monitoring module is further configured to: evaluate the signal; and
create the alarm condition if, upon evaluation, the signal is unauthorized.

15. The apparatus of claim 14, wherein the monitoring module is further configured to:
compare the signal to a set of known benign signals; and
determine the signal to be unauthorized when the signal does not correspond to any of the known benign signals.

16. The apparatus of claim 14, wherein the monitoring module is further configured to:
compare the signal to a set of known unauthorized signals; and
determine the signal to be unauthorized when the signal corresponds to one or more of the known unauthorized signals.

17. A method, comprising:
in a circuit, sending a strobe signal from a trusted strobe source at a predetermined time on a test data channel that connects a monitoring module to one or more integrated circuits in a boundary scan system; and
if the strobe signal is not received at the predetermined time at the monitoring module, asserting an alarm condition,
wherein trust for the trusted strobe source is derived from a trust anchor that is a component of a processor that is in communication with the test data channel and that is booted in a trusted state, and
the method further comprising:
receiving a response to the strobe signal, the response including a unique secret value that is generated in response to the strobe signal and that is generated for respective responses to subsequent strobe signals to confirm that the response and the respective responses are authentic.

18. The method of claim 17,
wherein the alarm condition is asserted if the response is not authentic.

19. One or more non-transitory computer readable storage media encoded with software comprising computer executable instructions that, when executed on a programmable processor, are operable to:
send a strobe signal on test data channel that connects a monitoring module to one or more integrated circuits in a boundary scan system; and
if the strobe signal is not received at the predetermined time at the monitoring module, assert an alarm condition,
wherein the software is trusted, and
the computer executable instructions that, when executed on a programmable processor, are operable to:
receive a response to the strobe signal, the response including a unique secret value that is generated in response to the strobe signal and that is generated for respective responses to subsequent strobe signals to confirm that the response and the respective responses are authentic.

20. The computer readable storage media of claim 19, wherein the software further comprise instructions that, when executed on the processor, are operable to:
assert the alarm condition is of the response is not authentic.

* * * * *